(12) United States Patent
Lunttila et al.

(10) Patent No.: US 12,170,965 B2
(45) Date of Patent: Dec. 17, 2024

(54) POWER CONTROL

(71) Applicant: NOKIA TECHNOLOGIES OY, Espoo (FI)

(72) Inventors: Timo Lunttila, Espoo (FI); Hans Höhne, Helsinki (FI); Kyoungmin Park, Yong-in (KP)

(73) Assignee: NOKIA TECHNOLOGIES OY, Espoo (FI)

( * ) Notice: Subject to any disclaimer, the term of this patent is extended or adjusted under 35 U.S.C. 154(b) by 339 days.

(21) Appl. No.: 17/593,329

(22) PCT Filed: Mar. 27, 2019

(86) PCT No.: PCT/FI2019/050250
§ 371 (c)(1),
(2) Date: Sep. 15, 2021

(87) PCT Pub. No.: WO2020/193841
PCT Pub. Date: Oct. 1, 2020

(65) Prior Publication Data
US 2022/0191805 A1   Jun. 16, 2022

(51) Int. Cl.
*H04W 4/00*   (2018.01)
*H04W 52/24*   (2009.01)
(Continued)

(52) U.S. Cl.
CPC ....... *H04W 52/242* (2013.01); *H04W 52/283* (2013.01); *H04W 74/0816* (2013.01)

(58) Field of Classification Search
CPC ............. H04W 52/242; H04W 52/283; H04W 74/0816; H04W 72/04; H04W 72/12; H04W 72/40; H04W 72/50
See application file for complete search history.

(56) References Cited

U.S. PATENT DOCUMENTS 9,363,829 B2   6/2016   Di Girolamo et al.
9,480,023 B2   10/2016   Gao et al.
(Continued)

OTHER PUBLICATIONS

International Search Report and Written Opinion for International Application No. PCT/FI2019/050250, mailed on Jul. 3, 2019, 13 pages.
(Continued)

*Primary Examiner* — Shantell L Heiber
(74) *Attorney, Agent, or Firm* — Lippes Mathias LLP

(57) ABSTRACT

According to an example aspect, there is provided an apparatus, configured to receive, by a user terminal, configuration for a grant-free transmission on a shared radio resource, the grant-free transmission comprising at least one collision avoidance transmission and at least one data transmission, wherein the at least one collision avoidance transmission precedes the at least one data transmission, determine a first transmission power for the at least one data transmission, determine a second transmission power for the at least one collision avoidance transmission based on information indicative to the a location of the user terminal proportionate to the a location of an access node providing a radio cell, and transmit the at least one collision avoidance transmission at the second determined power and the at least one data transmission at the determined first transmission power.

12 Claims, 5 Drawing Sheets

(51) Int. Cl.
*H04W 52/28* (2009.01)
*H04W 74/0816* (2024.01)

(56) References Cited

U.S. PATENT DOCUMENTS

| | | | |
|---|---|---|---|
| 10,117,193 | B2 | 10/2018 | Feuersaenger et al. |
| 2012/0214538 | A1 | 8/2012 | Kim et al. |
| 2014/0362779 | A1 | 12/2014 | Venkatachari et al. |
| 2016/0337984 | A1* | 11/2016 | Takeda .................. H04W 52/08 |
| 2018/0324853 | A1* | 11/2018 | Jeon ...................... H04W 52/04 |
| 2019/0053166 | A1 | 2/2019 | Nagaraja et al. |
| 2019/0059110 | A1 | 2/2019 | Zhang et al. |
| 2021/0007134 | A1* | 1/2021 | Li .......................... H04L 1/0003 |

OTHER PUBLICATIONS

3GPP ETSI TS 36.213, V14.8.0; Release 14; "LTE; Evolved Universal Terrestrial Radio Access (E-UTRA); Physical Lay Procedures"; Mar. 2019; 470 pages.

European Search Report for Application No. 19922033.6, mailed on Oct. 17, 2022, 9 pages.

"Revised SID on NR-based Access to Unlicensed Spectrum", 3GPP TSG RAN Meeting #80, RP-181339, Agenda: 9.4.3, Qualcomm Incorporated, Jun. 11-14, 2018, 5 pages.

"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.

"New WID on NR-based Access to Unlicensed Spectrum", 3GPP TSG RAN Meeting #82, RP-182878, Agenda: 9.1.1, Qualcomm Inc, Dec. 10-13, 2018, 8 pages.

"3rd Generation Partnership Project; Technical Specification Group Radio Access Network; NR; NR and NG-RAN Overall Description; Stage 2 (Release 15)", 3GPP TS 38.300, V15.4.0, Dec. 2018, pp. 1-97.

Notice of Allowance received for corresponding European Patent Application No. 19922033.6, dated Apr. 30, 2024, 8 pages.

Xia et al., "How loud to talk and how hard to listen-before-talk in unlicensed LTE", IEEE International Conference on Communication Workshop (ICCW), Jun. 8-12, 2015, pp. 2314-2319.

* cited by examiner

POWER CONTROL

CROSS-REFERENCE TO RELATED APPLICATIONS

This application is a national stage entry of International Application No. PCT/FI2019/050250, filed Mar. 27, 2019, entitled "POWER CONTROL" which is hereby incorporated by reference in its entirety.

FIELD

The present disclosure relates to wireless communication and power control therein.

BACKGROUND

Wireless communication, such as cellular wireless communication, may take place at the direction of an access node, comprised in a cellular communication network, for example. An access node may provide transmission permissions, grants, to user terminals in cells controlled by the access node, for example via a physical downlink control channel, PDCCH, or a corresponding channel.

When user terminals are to transmit on an unlicensed spectrum, which is an example of a shared spectrum as the spectrum may be shared by other users and even other systems, the cellular network may configure the user terminals for grant free operation, which may be known as "configured grants". In grant free operation, user terminals may employ the listen-before-talk, LBT, principle to assess if a radio resource they intend to use is free for use.

BRIEF DESCRIPTION

According to some aspects, there is provided the subject-matter of the independent claims. Some embodiments are defined in the dependent claims.

According to a first aspect of the present disclosure, there is provided an apparatus, comprising at least one processor and at least one memory including a computer program code, the at least one memory and the computer program code configured to, with the at least one processor, cause the apparatus at least to receive, by a user terminal, configuration for a grant-free transmission on a shared radio resource, the grant-free transmission comprising at least one collision avoidance transmission and at least one data transmission, wherein the at least one collision avoidance transmission precedes the at least one data transmission, determine a first transmission power for the at least one data transmission, determine a second transmission power for the at least one collision avoidance transmission based on information indicative to the a location of the user terminal proportionate to the a location of an access node providing a radio cell, and transmit the at least one collision avoidance transmission at the second determined power and the at least one data transmission at the determined first transmission power.

According to a second aspect of the present disclosure, there is provided a method comprising receiving, by a user terminal, configuration for a grant-free transmission on a shared radio resource, the grant-free transmission comprising at least one collision avoidance transmission and at least one data transmission, wherein the at least one collision avoidance transmission precedes the at least one data transmission, determining a first transmission power for the at least one data transmission, determining a second transmission power for the at least one collision avoidance transmission based on information indicative to a location of the user terminal proportionate to a location of an access node providing a radio cell, and transmitting the at least one collision avoidance transmission at the second determined power and the at least one data transmission at the determined first transmission power.

According to a third aspect of the present disclosure, there is provided a computer program comprising instructions which, when the program is executed by an apparatus, cause the apparatus to carry out the method in accordance with the second aspect.

According to a fourth aspect of the present disclosure, there is provided an apparatus comprising means for carrying out the method in accordance with the second aspect.

According to a fifth aspect of the present disclosure, there is provided a non-transitory computer readable medium having stored thereon a set of computer readable instructions that, when executed by at least one processor, cause an apparatus to at least receive, by a user terminal, configuration for a grant-free transmission on a shared radio resource, the grant-free transmission comprising at least one collision avoidance transmission and at least one data transmission, wherein the at least one collision avoidance transmission precedes the at least one data transmission, determine a first transmission power for the at least one data transmission, determine a second transmission power for the at least one collision avoidance transmission based on information indicative to a location of the user terminal proportionate to a location of an access node providing a radio cell, and transmit the at least one collision avoidance transmission at the second determined power and the at least one data transmission at the determined first transmission power.

DESCRIPTION OF SOME EMBODIMENTS

Figure 1A:
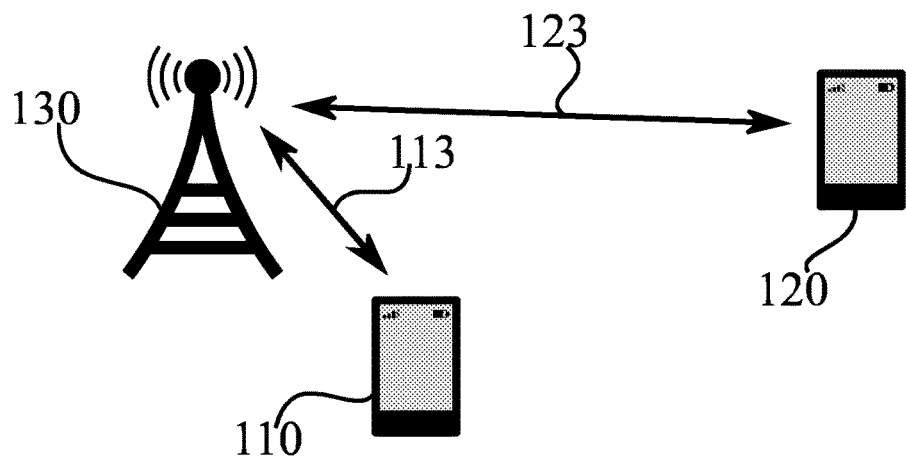
FIG. 1A illustrates an example system.

FIG. 1A illustrates an example system in accordance with at least some embodiments. Access node (such as a gNB) 130 may be comprised in a cellular communication system, such as fifth generation, 5G, also known as New Radio, NR, or long-term evolution, LTE, for example.

In this example, wireless link 113 connects access node 130 with user terminal (user equipment, UE, user device) 110. Likewise, wireless link 123 connects access node 130 with user terminal 120. The wireless link may comprise a downlink for communicating from an access node towards a user terminal, and an uplink for communicating from the user terminal to the access node. A user terminal typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user terminal may also be a nearly exclusive uplink only device, of which an example is a camera or video camera loading images or video clips to a network. The user terminal may also be a device having capability to operate in Internet of Things (IoT) network which is a scenario in which objects are provided with the ability to transfer data over a network without requiring human-to-human or human-to-computer interaction. The user terminal may also utilise cloud: in some applications, the user terminal may comprise a small portable device with radio parts (such as a watch, earphones or eyeglasses) and the computation is carried out in the cloud.

An access node may, in general, be configured to control user terminal transmissions by assigning grants to the user terminals. A grant may be seen as a permission to send using radio resources specified in the grant, implicitly or explicitly. In some systems, the radio channel the access node uses to assign grants to user terminal is called a physical downlink control channel, PDCCH. On the other hand, where it is desired to use radio resources which the access node does not have exclusive control over, such as an unlicensed spectrum or other shared radio resource, for example, grant free operation may be performed. In NR, grant free operation is referred to as "configured grants", or Autonomous Uplink. In configured grant operation, instead of transmitting separate grant for each transmission of a user terminal, and access node may grant radio resources on a long-term basis, and the user terminals may then use those resources when necessary, without a further indication.

As the access node does not have exclusive control over the shared resources, it cannot directly allow the user terminal to transmit on these resources, for example, to transmit information to the access node 130 itself. Rather, multisystem coexistence methods may be employed, one of which is listen-before-talk, LBT. When using LBT, a user terminal planning to perform a transmission may first perform a test reception on the radio resources it plans to use, and then it will perform the transmission in case it does not receive energy during the test reception which would indicate another node is presently using the radio resources in question. By not receiving energy it is meant, that a received energy is less than an energy detection threshold in the user terminal. The test reception may be referred to as a listening period.

To interoperate with other user terminals using LBT, a user terminal initiating a transmission may transmit a collision avoidance signal before transmitting data in a data portion. We may designate a collision avoidance signal transmission also as a collision avoidance transmission. The collision avoidance transmission functions to reserve radio resources to the use of the transmitting user terminal, as other user terminal s intending to use the same resources will detect the collision avoidance transmission in their LBT respective listening periods, and responsively abstain from trying to use the resources.

To enable a user terminal to use shared radio resources, such as unlicensed resources or licensed radio resources shared with another system, an access node may provide to the user terminal information defining a permission for the user terminal to transmit on the shared resources. This information may comprise, for example, an assignment of specific radio resources the user terminal may use provided they appear to be free. The specific radio resources may comprise, depending on the technology used, a frequency, a spreading code, a physical resource block (PRB), an interlace, or a combination thereof. The information may further comprise a time offset from a reference point, which the user terminal must wait before beginning to transmit a collision avoidance signal.

Figure 1B:
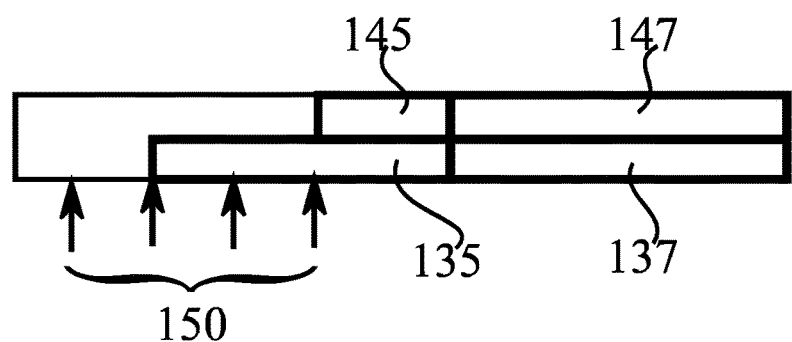
FIG. 1B illustrates an example transmission in accordance with at least some embodiments.

FIG. 1B illustrates an example transmission in accordance with at least some embodiments. An example of time offset is illustrated in FIG. 1B. FIG. 1B illustrates collision avoidance signal 145, followed by data transmission or portion 147. Similarly, collision avoidance signal 135 precedes data portion or transmission 137. A collision avoidance transmission or signal may be e.g. an extension of a cyclic prefix of the next OFDM symbol containing PUSCH data or reference signals. These transmissions may take place using the same specific radio resources, which have been assigned to two different user terminals. These resources are thus shared between user terminals.

A plurality of time offsets 150 may be assigned, to user terminals, for example in a one-to-one assignment such that each user terminal is allocated one offset, and each offset is provided to one user terminal only. Alternatively, more than one user terminal may be given the same time offset, in case the user terminals are expected to only fairly rarely try to use the shared resources. Yet another option is that each user terminal is given a set of possible offset values, and the user terminal chooses to use one of them is a (pseudo-) random fashion. The selection is done before each grant-free transmission. For example, collision avoidance transmission or signal 145 and data portion 147 may relate to user terminal 120, and collision avoidance transmission or signal 135 and data portion or transmission may relate to user terminal 110. Time offsets can be used as a mechanism to enable "overbooking" the specific radio resources allocated to the user terminals for grant-free transmission, by allocating the same specific radio resources to a plurality of user terminals, giving each of the plurality of user terminals a time offset with regard to the resources. The user terminal with the smallest offset may effectively have highest-priority access to the resources, since this user terminal may start a collision avoidance signal transmission first, to pre-empt the other potential users of the shared resources. In the example of FIG. 1A, a higher-priority user terminal 110, with a smaller time offset, may be relatively near the access node and a lower-priority user terminal 120, with a larger time offset, may be further away. Normal power control methods cause a transmission power of user terminal 110 to be relatively low, as it only needs to enable the nearby access node 130 to receive its transmissions. Thus, collision avoidance signal 135 could be transmitted at such a low power, that it does not trigger a detection of power during a LBT listening period at user terminal 120. Thus, user terminal 120 might start using the specific radio resources user terminal 110 is already using, resulting in an interfering collision. Some embodiments provide an option to lower the likelihood of such a collision.

It should be appreciated that the coding of software for carrying out the embodiments shown and described below is well within the scope of a person of ordinary skill in the art.

Figure 5:
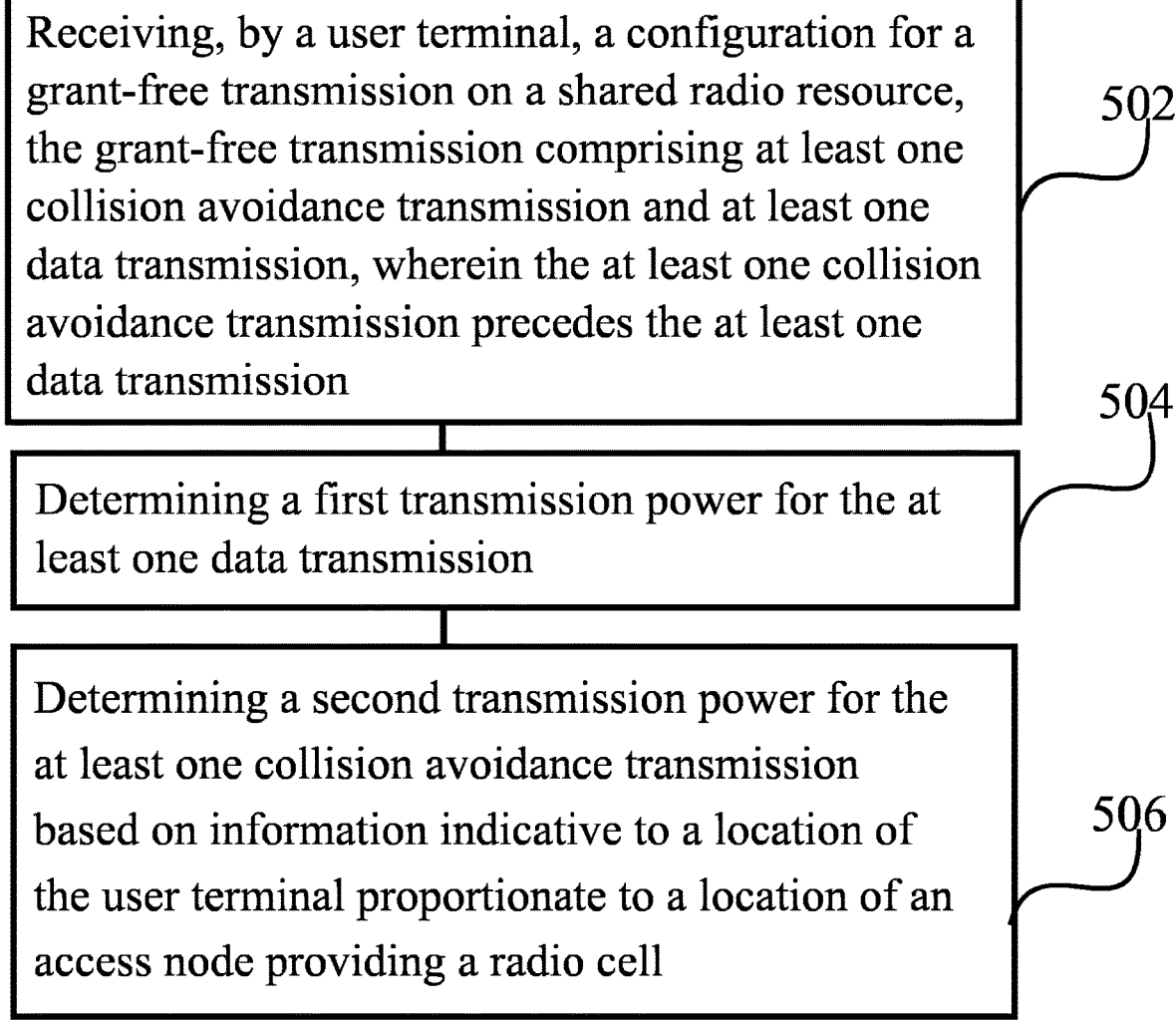
FIG. 5 is a flow graph.

One embodiment starts in block 500 of FIG. 5. This embodiment is suitable for being carried out by a user device. Terms "receive" and "transmit" may comprise reception or transmission via a radio path. These terms may also mean preparation of a message to the radio path for an actual transmission or processing a message received from the radio path, for example, or controlling or causing a transmission or reception, when embodiments are implemented by software.

In block 502, configuration for a grant-free transmission on a shared radio resource is received. The grant-free transmission comprises at least one collision avoidance transmission, such as a preamble or extension of a cyclic prefix of a data symbol, and at least one data transmission, wherein the at least one collision avoidance transmission precedes the at least one data transmission. We may designate the contents of the collision avoidance transmission as collision avoidance signal. The configuration may be received once in an initialization phase, periodically or when an access node carries out a reconfiguration or when the user device requests it, for example. When the at least one collision avoidance transmission comprises a preamble, it may immediately precede a first one of the at least one data transmission.

In block 504, a first transmission power for the at least one data transmission is determined. The first transmission power may be determined in a corresponding manner to a normal power control procedure in the system, for example a closed-loop or open-loop power control procedure, or any combination thereof. In block 506, a second transmission power is determined for the at least one collision avoidance transmission based on information indicative to the location of the user terminal proportionate to the location of an access node providing a radio cell.

The power or power level may be determined for the collision avoidance transmission being receivable in the area of the radio cell or in the example situation of FIG. 1B. The collision avoidance transmission or signal may be a preamble, or an extension of a cyclic prefix of a data symbol, a (control) signal or a part of a suitable signal, or any form of transmission named collision avoidance transmission, for example.

It should be understood that transmitting also the data transmission or portion at a higher power would cause more interference in the system, whereby transmitting only the collision avoidance transmission at an increased power provides enhanced coexistence on the shared resources, while controlling interference. A plurality of alternatives for the determining will be laid out.

A first example alternative comprises selecting a predetermined constant power level for the collision avoidance transmission. The power level may be either fixed in specifications or standards, such as a maximum power allowed by regulations, or the maximum power supported by a user terminal (UE, user device), such as 23 dBm, for example. Alternatively, the power level may be signaled to a user terminal from an access node, for example as part of the information defining the permission for the user terminal to transmit on the shared radio resources. However, the power level for collision avoidance transmission should always larger than or equal to the power level of the data transmission. If the required power for the data transmission is higher than the configured power of the collision avoidance transmission, the user terminal should set the same power to the collision avoidance transmission and data transmission transmissions as follows:

$$P_{AUL,CollAvoidTx} = \text{MAX} \begin{cases} \text{Tx\_Power\_for\_AUL\_Coll\_Avoid\_Tx} \\ P_{AUL,data} \end{cases} \quad (1)$$

wherein $P_{ALU,data}$ is a value given by power control equation such as:

$$P_{ALU,data} = \min \begin{cases} P_{CMAX} \\ P_{0\_PUSCH} + 10\log 10(2^\mu M^{PUSCH}) + \alpha PL + \Delta_{TF} \end{cases} \quad (2)$$

wherein $P_{O\_PUSCH}$ denotes the power control operating point or power offset of the UL data channel, $2^\mu M^{PUSCH}$ denotes the amount of frequency resources that are being used for transmission, $\alpha PL$ denotes a pathloss related component, $\Delta_{TF}$ denotes a transport format related component, and $P_{CMAX}$ denotes the maximal UL transmit power that the UE can use In other words, in the first example alternative the transmit power of the collision avoidance transmission is the larger of: the predetermined constant power level and the transmit power level of the data transmission.

A second example alternative comprises selecting a power level for the collision avoidance transmission which is the transmission power level for the data transmission in question or transmission incremented by a predetermined power offset. The size of the power offset, for example 3 dB or an offset expressed in Watts, may be signaled to the user terminal by the access node, for example via radio resource control (RRC) signaling. This alternative may correspond to adding a power offset on top of a target received power at the access node, for example, i.e. $P_{0\_AUL}$ term in the power control formulas, for example:

$$P_{ALU,CollAvoidTx} = \min \begin{cases} P_{CMAX} \\ P_{ALU,data} + P_{0\_CollAvoidTx} \end{cases} \quad (3)$$

wherein $P_{0\_CollAvoidTx}$ denotes the power offset of the collision avoidance transmission, and wherein $P_{AUL,data}$ is controlled by PUSCH power control such as shown in Equation (2).

In other words, the transmit power of the collision avoidance transmission is the smaller of: a maximum power the terminal device supports and the data transmission transmit power incremented by the power offset.

A third example alternative comprises selecting a power level for the collision avoidance transmission based on a pathloss between a user terminal and an access node such that the lower the pathloss, the higher the transmission power for the collision avoidance transmission. The pathloss is the difference between a transmitted power and a received power. For example, the power level for the collision avoidance transmission may be inversely proportional to the pathloss, or the power level for the collision avoidance transmission may increase linearly with decreasing pathloss. This may be equivalent to adding into power control formulas a second "alpha" parameter, which may have a negative value. However, the collision avoidance transmission transmit power should here also always be at least the data portion or data transmission transmit power, for example:

$$P_{AUL,CollAvoidTx} = \text{MAX} \begin{cases} P_{AUL,data} \\ P_{AUL,CollAvoidTx\_ini} \end{cases} \quad (4)$$

wherein $P_{AUL,data}$ is controlled by PUSCH power control such as shown in Equation (2)

$P_{AUL,CollAvoidTx\_ini}$ denotes the calculation of required power for the collision avoidance part of the autonomous transmission and wherein $P_{AUL,CollAvoidTx\_ini}$ may be determined as follows:

$$P_{AUL,\text{CollAvoidTx\_ini}} = \min\left\{\begin{array}{l} P_{CMAX} \\ P_{0,CollAvoidTx} + \alpha_2 PL \end{array}\right. \quad (5)$$

wherein $P_{CMAX}$ denotes the maximal power that the UE can use $P_{0,CollAvoidTx}$ denotes a power offset that is used for the collision avoidance signal $\alpha_2 PL$ denotes a pathloss related component As another example, transmission power for the collision avoidance transmission may be determined:

$$P_{AUL,\text{CollAvoidTx\_ini}} = \min\left\{\begin{array}{l} P_{CMAX} \\ P_{AUL,data} + P_{0,CallAvoidTx} + \alpha_2 PL \end{array}\right. \quad (6)$$

wherein $P_{AUL\_data}$ denotes the power of the data part of the UL transmission $P_{0,CallAvoidTx}$ denotes the power offset for the collision avoidance signal $\alpha_2 PL$ denotes a pathloss related component Pathloss may be obtained from receiving from an access node a report concerning a power level at which a signal from a user terminal was received, or, alternatively or additionally, the user terminal may determine an estimate of the pathloss from a power control value in use with the access node, since the access node will, in general, instruct the user terminal to increase transmit power in general as a response to higher pathloss. Moreover, the user terminal may also estimate the pathloss by itself based on the power level at which it receives transmissions, such as synchronization signals or reference signals, from the access node.

A fourth example alternative comprises selecting a power level for the collision avoidance transmission based on a timing advance value between a user terminal and an access node, such that the smaller the timing advance value is, the higher the transmission power for the collision avoidance transmission. It should be understood that timing advance and user device's distance from the access node are usually correlated, but not necessarily one-to-one. Transmission power for the collision avoidance transmission may be determined as follows:

$$P_{AUL,\text{CollAvoidTx}} = \min\left\{\begin{array}{l} P_{CMAX} \\ P_{AUL,data} + g(\Delta_t) \end{array}\right. \quad (7)$$

$P_{AUL\_data}$ denotes the data part of the UL transmission $P_{CMAX}$ denotes the maximal power that the UE can use $g(\Delta_t)$ denotes a timing advance value related component An access node may set a small timing advance value for user terminals close to it, and larger timing advance values for user terminals located further from it, and hence timing advance value can be indicative of the user terminal's distance from the access node. Thus, this resembles the third alternative, since the pathloss is expected to be smaller, when the user terminal is closer to the access node. User terminals close to the access node will use high transmission powers for their collision avoidance transmission transmissions, while cell-edge user terminals would use lower collision avoidance transmission transmit powers. The collision avoidance transmission transmit power should here also always be at least the data transmission transmit power also in this case. Cell-edge user terminals will have data transmission transmit powers that are fairly high to begin with. The timing advance value, in general, is used to allow time for radio signal propagation from further-away user terminals and is thus an indication of the physical distance between the user terminal and the access node. The user terminal will have the timing advance value, since it needs it to perform normal transmissions with the access node.

A fifth example alternative comprises selecting a power level for the collision avoidance transmission based on an outcome of an earlier transmission, such that in case the earlier transmission is unsuccessful, the transmission power for the collision avoidance transmission is increased. If a user terminal close to an access node does not get an acknowledgment for its grant-free transmission, it may assume that there is a possibility that the resources were overbooked, that it was not heard by another transmitting user terminal farther away, and that a collision occurred on the specific resources reserved and used for the earlier transmission. Consequently, the user terminal may for the next grant-free transmission increase the power of its collision avoidance transmission by, for example, a predefined amount in decibels or Watts. The predefined amount may be configurable by the access node, for example with RRC signaling comprising configuration information.

Additionally, user terminals or an access node may be able to determine transmission powers for a plurality of user terminals using the pathloss differences between the terminals. The pathloss differences between terminals can be for instance known in systems where device-to-device communication is enabled, or where the user terminals are able to listen to collision avoidance signals of each other, or where the access node is aware of locations of the user terminals and a pathloss map. In those cases, the collision avoidance transmission power may be scaled with a user terminal to user terminal pathloss and the data transmission may be scaled according to a user terminal to an access node pathloss.

When narrow antenna beams are used, the pathloss between user terminals may be derived from the pathloss of at least one user terminal to an access node: PL (UE1–UE2) =PL(UE2–gNB)–PL(UE1–gNB), where PL(x–y) denotes the pathloss between two terminals x and y.

If it is assumable that an access node does not need to hear a collision avoidance transmission (such as an extension of a cyclic prefix of a data symbol, but only the regular cyclic prefix), the collision avoidance signal power can be scaled to be lower than the data part of the UL transmission. It may be scaled such that only another nearby terminal can hear it.

The first procedure to select the power level for the collision avoidance transmission may also be a combination of two or more of the alternatives described above. For example, a power offset relative to the data transmission (alternative 2) may be increased in case the transmission is initially not successful (alternative 5). The alternatives described above are graphically laid out in FIG. 2. In general, configuration information received in the user terminal from the access node may define the power offset and/or mathematical function(s) enabling selection of the collision avoidance signal transmit power based on the pathloss, timing advance and/or an outcome of an earlier transmission.

Figure 2:
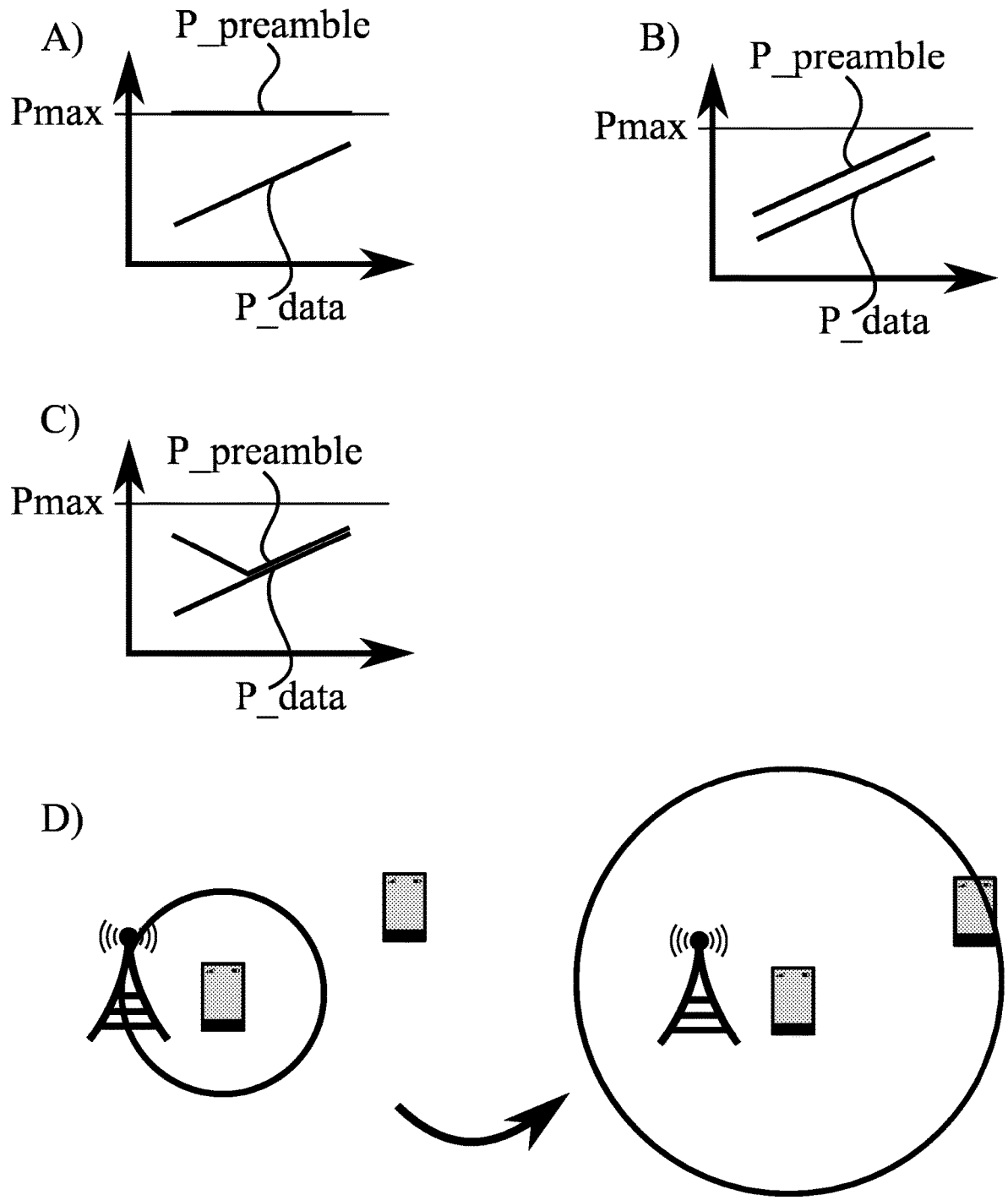
FIG. 2 illustrates embodiments of power control.

FIG. 2 illustrates some embodiments of power control or setting for collision avoidance transmission. At the top left, denoted "A)", is the first alternative laid out above. For any data transmission transmit power P_data, the collision avoidance transmission transmit power, P_collision avoidance transmission, is the maximum allowed, either in the cell, a network, or for a user terminal. In other variants of the first alternative, the constant P_collision avoidance transmission may be other than the maximum allowed, as long as it is always at least P_data and not less.

At the top right, denoted "B)", is the second example alternative laid out above. The collision avoidance transmission transmit power is the data transmission transmit power incremented by a power offset. In other words, the collision avoidance transmission power is always higher than the data transmission transmit power by a constant offset, which may be expressed in decibels or Watts, for example. The size of the offset may be communicated from the access node to the user terminal via signaling, such as RRC signaling, for example. Of course, the collision avoidance transmission transmit power may not exceed a maximum transmit power allowed or possible for the user terminal, also in this case.

In the middle, left, denoted "C)" is the third example alternative laid out above. The collision avoidance transmission power is boosted relative to the data transmission transmit power when the user terminal is close to the access node, that is, when the transmission power of the data transmission, and pathloss, is low. Normal power control will cause the transmission power of the data transmission to be low when the user terminal is close to the access node, since communication can successfully be performed to the access node with low power, which also reduced unwanted interference in the system. For user terminals further away, the collision avoidance transmission is transmitted with the same power as the data transmission, in this example. In another example of the third alternative, a small power offset is allowed to remain also for user terminals further away from the access node. The fourth alternative may look similar in graphical terms as the "C)" illustration of FIG. 2, as the timing advance is used instead of pathloss.

In the lowest part of FIG. 2, denoted "D)", is the fifth example alternative laid out above. On the left, a user terminal close to the access node transmits a grant-free collision avoidance transmission and data transmission, which collides with a similar transmission from another user terminal, also depicted in FIG. 2. The circle around the first-mentioned user terminal illustrates schematically the range of the collision avoidance transmission. Responsive to the failed transmission, the user terminal will re-transmit, now increasing the transmit power of the collision avoidance transmission, which is illustrated on the lower right. The other user terminal can now perceive the collision avoidance transmission during its LBT listening period, and it will responsively abstain from transmitting, thus avoiding a repeat of the collision. The transmission of the user terminal close to the access node may then succeed.

Figure 3:
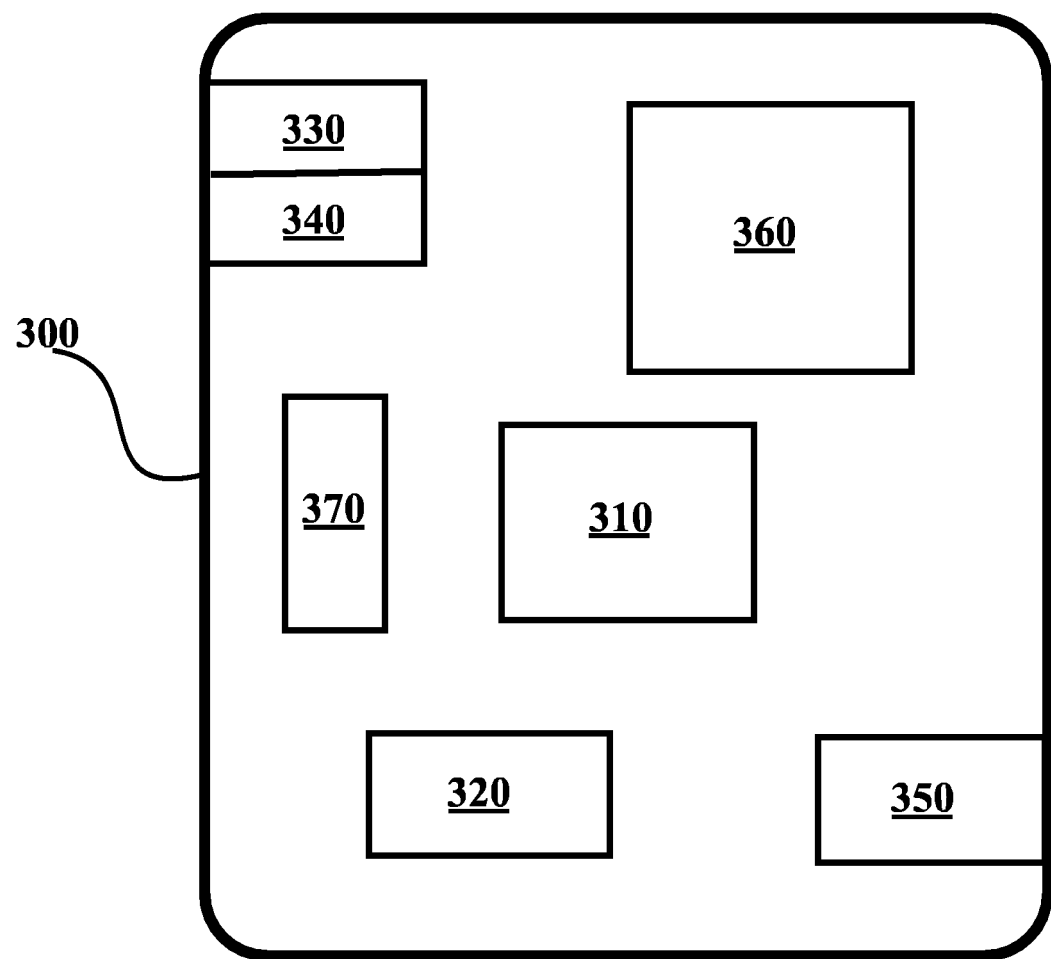
FIG. 3 illustrates an example apparatus.

FIG. 3 illustrates an example apparatus capable of supporting at least some embodiments. Illustrated is device 300, which may comprise, for example, a user terminal 110 of FIG. 1. In applicable parts, the illustrated device may also correspond to an access node 130, or an access point. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor (s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. The circuitry or circuits may also be a system-on-chip type of an integrated circuit.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

An apparatus or device may also comprise means for receiving (340), by a user terminal, configuration for a grant-free transmission on a shared radio resource, the grant-free transmission comprising at least one collision avoidance transmission and at least one data transmission, wherein the at least one collision avoidance transmission precedes the at least one data transmission, means for determining (310) a first transmission power for the at least one data transmission, means for determining (310) a second transmission power for the at least one collision avoidance transmission based on information indicative to the location of the user terminal proportionate to the location of an access node providing a radio cell, and means for transmitting (330) the at least one collision avoidance transmission at the second determined power and the at least one data transmission at the determined first transmission power.

Device or apparatus may be, include or be associated with at least one software application, module, unit or entity configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. The data storage medium may be a non-transitory medium. The computer program or computer program product may also be downloaded to the apparatus. A computer program product may comprise one or more computer-executable components which, when the program is run, for example by one or more processors possibly also utilizing an internal or external memory, are configured to carry out any of the embodiments or combinations thereof described above. The one or more computer-executable components may be at least one software code or portions thereof. Computer programs may be coded by a programming language or a low-level programming language.

Embodiments provide computer programs comprising instructions which, when the program is executed by an apparatus, cause the apparatus to carry out embodiments described by means of FIG. 5. The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. As an alternative to a serial bus, the transmitter may comprise a parallel bus transmitter. Likewise, processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. As alternative to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
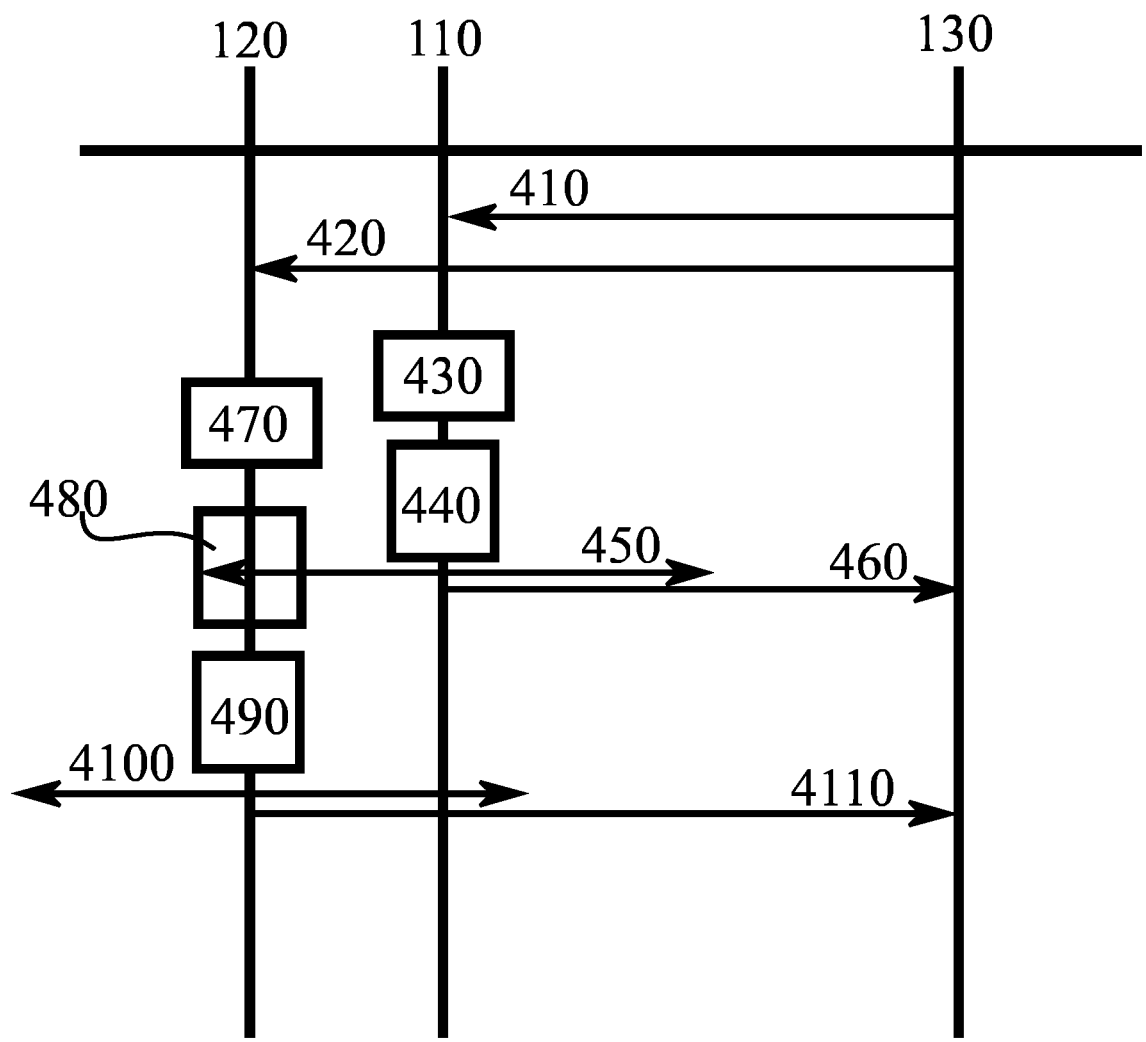
FIG. 4 illustrates a signaling example.

FIG. 4 illustrates signaling in accordance with at least some embodiments. On the vertical axes are disposed, from the left, user terminal 120 of FIG. 1A, user terminal 110 of FIG. 1A, and the access node 130 of FIG. 1A. Time advances from the top toward the bottom.

In phases 410 and 420, access node 130 provides to the user terminal 110 and 120, respectively, information defining permissions for the respective user terminals to transmit on shared radio resources. The contents of this information have been described herein above. The specific resources allocated to user terminal 110 and 120 are, in this example, the same.

In phase 430, user terminal 110 resolves to attempt a transmission on the shared radio resources. Phase 440 is an LBT listening period phase to determine, if the specific resources allocated to user terminal 110 are free. In this example they are free, and phase 450 follows, that being a collision avoidance transmission t, wherein the collision avoidance transmission power is selected using a different process than the selection of the data transmission t power. The data transmission is transmitted to access node 130 in phase 460.

In phase 470, user terminal 120 resolves to attempt a transmission on the shared radio resources. Phase 480 is an LBT listening period phase to determine, if the specific resources allocated to user terminal 120 are free. In this example they are not free, as the boosted collision avoidance transmission t (phase 450) from user terminal 110 takes place during phase 480 and is detected by user terminal 120. The boosted collision avoidance transmission power facilitates the detection of the collision avoidance transmission Responsive to the detection, user terminal 120 abstains from the transmission, instead waiting and then performing a new LBT listening period phase, phase 490 of FIG. 4. By this time the resources are free, and user terminal 120 proceeds to transmit a collision avoidance transmission, phase 4100, and the data transmission, phase 4110, to access node 130.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

ACRONYMS LIST

| | |
|---|---|
| 5G | Fifth generation |
| CG | Configured grant |
| gNB | New Radio Base Station |
| LBT | Listen-before-talk |
| LTE | Long term evolution |
| NR | New radio |
| PDCCH | Physical downlink control channel |
| PUSCH | Physical uplink shared channel |
| RRC | Radio resource control |
| TA | Timing advance |
| UE | User equipment |
| WiMAX | Worldwide interoperability for microwave access |
| WLAN | Wireless local area network |

REFERENCE SIGNS LIST IN EXAMPLES

| | |
|---|---|
| 110, 120 | user terminals |
| 130 | access node |
| 113, 123 | Wireless links |
| 135, 145 | Collision avoidance transmissions |
| 137, 147 | Data transmissions (portions) |
| 150 | Time offsets |
| 300-370 | Structure of the device of FIG. 3 |
| 410-4110 | Phases of signaling in FIG. 4 |
| 510-530 | Phases of the method of FIG. 5 |

The invention claimed is:

1. An apparatus comprising:
at least one processor and at least one memory including a computer program code, the at least one memory and the computer program code configured to, with the at least one processor, cause the apparatus at least to:
receive, by a user terminal, configuration for a grant-free transmission on a shared radio resource, the grant-free transmission comprising at least one collision avoidance transmission and at least one data transmission, wherein the at least one collision avoidance transmission precedes the at least one data transmission;
determine a first transmission power for the at least one data transmission; determine a second transmission power for the at least one collision avoidance transmission based on information indicative to a location of the user terminal proportionate to a location of an access node providing a radio cell, and transmit the at least one collision avoidance transmission at the second determined power and the at least one data transmission at the determined first transmission power, wherein, in the case the information indicative to the location of the user terminal proportionate to the location of the access node is timing advance value, the second transmission power is determined such that the smaller the timing advance value, the higher the transmission power, and wherein, in the case the information indicative to the location of the user terminal proportional to the location of the access node is a cell identity, the second transmission power is determined based on an indication from the access node comprising transmission power or transmission power offset proportionate to the first transmission power.

2. The apparatus according to claim 1, wherein, in the case the information indicative to the location of the user terminal proportionate to the location of the access node is pathloss, the second transmission power is determined such that the lower the pathloss, the higher the second transmission power.

3. The apparatus according to claim 1, further comprising causing the apparatus to: increase the second transmission power based on an outcome of an earlier transmission, such that in case the earlier transmission is unsuccessful, the transmission power is increased.

4. The apparatus according to claim 1, wherein the shared radio resource comprises unlicensed radio spectrum.

5. The apparatus according to claim 1, wherein the at least one collision avoidance transmission comprises a preamble.

6. The apparatus according to claim 1, wherein the at least one collision avoidance transmission comprises a preamble and wherein the preamble immediately precedes a first one of the at least one data transmission.

7. The method according to claim 1, wherein the at least one collision avoidance transmission comprises a preamble and wherein the preamble immediately precedes a first one of the at least one data transmission.

8. A method comprising:

receiving, by a user terminal, configuration for a grant-free transmission on a shared radio resource, the grant-free transmission comprising at least one collision avoidance transmission and at least one data transmission, wherein the at least one collision avoidance transmission precedes the at least one data transmission;

determining a first transmission power for the at least one data transmission;

determining a second transmission power for the at least one collision avoidance transmission based on information indicative to a location of the user terminal proportionate to a location of an access node providing a radio cell, and transmitting the at least one collision avoidance transmission at the second determined power and the at least one data transmission at the determined first transmission power, wherein, in the case the information indicative to the location of the user terminal proportionate to the location of the access node is timing advance value, the second transmission power is determined such that the smaller the timing advance value, the higher the transmission power, and wherein, in the case the information indicative to the location of the user terminal proportional to the location of the access node is a cell identity, the second transmission power is determined based on an indication from the access node comprising transmission power or transmission power offset proportionate to the first transmission power.

9. The method according to claim 8, wherein, in the case the information indicative to the location of the user terminal proportionate to the location of the access node is pathloss, the second transmission power is determined such that the lower the pathloss, the higher the second transmission power.

10. The method according to claim 8, further comprising increasing the second transmission power based on an outcome of an earlier transmission, such that in case the earlier transmission is unsuccessful, the transmission power is increased.

11. The method according to claim 8, wherein the shared radio resource comprises unlicensed radio spectrum.

12. The method according to claim 8, wherein the at least one collision avoidance transmission comprises a preamble.

\* \* \* \* \*